United States Patent
Kawamura et al.

(10) Patent No.: US 7,575,830 B2
(45) Date of Patent: Aug. 18, 2009

(54) LITHIUM SECONDARY BATTERY

(75) Inventors: Naoya Kawamura, Kyoto (JP); Soichiro Kawakami, Nara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/798,348

(22) Filed: May 14, 2007

(65) Prior Publication Data

US 2007/0218356 A1    Sep. 20, 2007

Related U.S. Application Data (62) Division of application No. 10/808,481, filed on Mar. 25, 2004, now abandoned.

(30) Foreign Application Priority Data

Mar. 31, 2003   (JP)   ............................. 2003-096988

(51) Int. Cl.
    *H01M 4/58*   (2006.01)
(52) U.S. Cl. .................... 429/218.1; 429/233; 429/232; 429/217; 252/521.3
(58) Field of Classification Search ............. 429/218.1, 429/233, 232, 217; 252/521.3
    See application file for complete search history.

(56) References Cited

U.S. PATENT DOCUMENTS

| | | | |
|---|---|---|---|
| 5,491,037 A | 2/1996 | Kawakami | 429/49 |
| 5,641,591 A | 6/1997 | Kawakami et al. | 429/218 |
| 5,658,689 A | 8/1997 | Kawakami et al. | 429/194 |
| 5,698,339 A | 12/1997 | Kawakami et al. | 429/212 |
| 5,702,845 A | 12/1997 | Kawakami et al. | 429/224 |
| 5,707,759 A | 1/1998 | Simon et al. | 429/217 |
| 5,728,482 A | 3/1998 | Kawakami et al. | 429/10 |
| 5,795,679 A | 8/1998 | Kawakami et al. | 429/218 |
| 5,800,939 A | 9/1998 | Mishina et al. | 429/57 |
| 5,824,434 A | 10/1998 | Kawakami et al. | 429/209 |
| 5,882,811 A | 3/1999 | Kawakami | 429/49 |
| 5,888,666 A | 3/1999 | Kawakami | 429/62 |

(Continued)

FOREIGN PATENT DOCUMENTS

EP    0 762 525    3/1997

(Continued)

OTHER PUBLICATIONS

L. Y. Beaulieu, et al., "The Electrochemical Reaction of Li with Amorphous Si-Sn Alloys", Journal of the Electrochemical Society, vol. 150, No. 2, 2003, pp. A149-A156.

*Primary Examiner*—Laura S Weiner
(74) *Attorney, Agent, or Firm*—Fitzpatrick, Cella, Harper & Scinto (57) ABSTRACT

There is provided a lithium secondary battery with a negative electrode which comprises a negative electrode active material layer comprising alloy particles comprising silicon and tin and having an average particle diameter of 0.05 to 2 μm as an active material, and a negative electrode current collector, wherein the negative electrode active material layer has a storage capacity of 1,000 to 2,200 mAh/g and a density of 0.9 to 1.5 g/cm$^3$ and which thereby has a high capacity and a good cycle-characteristic. Thus, a lithium secondary battery having a high capacity and a long life and so designed as to exhibit these characteristics at the same time is provided.

8 Claims, 5 Drawing Sheets

U.S. PATENT DOCUMENTS

| | | | |
|---|---|---|---|
| 5,919,589 A | 7/1999 | Kawakami et al. | 429/231.8 |
| 5,998,063 A | 12/1999 | Kobayashi et al. | 429/218.1 |
| 6,051,340 A | 4/2000 | Kawakami et al. | 429/231.95 |
| 6,063,142 A | 5/2000 | Kawakami et al. | 29/623.5 |
| 6,165,642 A | 12/2000 | Kawakami et al. | 429/218.1 |
| 6,235,427 B1 | 5/2001 | Idota et al. | |
| 6,329,096 B2 | 12/2001 | Kawakami et al. | 429/49 |
| 6,372,387 B1 | 4/2002 | Kawakami et al. | 429/303 |
| 6,377,030 B1 | 4/2002 | Asao et al. | 320/161 |
| 6,383,686 B1 | 5/2002 | Umeno et al. | 429/231.8 |
| 6,432,585 B1 | 8/2002 | Kawakami et al. | 429/233 |
| 6,475,664 B1 | 11/2002 | Kawakami et al. | 429/137 |
| 6,517,974 B1 | 2/2003 | Kobayashi et al. | 429/231.95 |
| 6,558,847 B1 | 5/2003 | Kawakami et al. | 429/231.95 |
| 6,558,848 B1 | 5/2003 | Kobayashi et al. | 429/241 |
| 6,569,568 B2 | 5/2003 | Kobayashi et al. | 429/221 |
| 6,596,432 B2 | 7/2003 | Kawakami et al. | 429/60 |
| 6,638,322 B1 | 10/2003 | Kawakami et al. | 29/623.1 |
| 6,649,304 B2 | 11/2003 | Tani et al. | 429/223 |
| 6,730,434 B1 | 5/2004 | Kawakami et al. | 429/218.1 |
| 6,835,332 B2 | 12/2004 | Yamamoto et al. | 252/519.1 |
| 6,902,845 B2 | 6/2005 | Tani et al. | 429/218.2 |
| 6,924,059 B1 | 8/2005 | Kawakami et al. | 429/162 |
| 6,932,955 B2 | 8/2005 | Yamamoto et al. | 423/518 |
| 6,949,312 B1 | 9/2005 | Kawakami et al. | 429/218.1 |
| 7,141,187 B2 | 11/2006 | Kosuzu et al. | 252/521.3 |
| 7,190,171 B2 | 3/2007 | Kawakami et al. | 324/430 |
| 2004/0175618 A1 | 9/2004 | Inoue et al. | 429/231.1 |
| 2004/0248011 A1 | 12/2004 | Asao et al. | 429/231.95 |

FOREIGN PATENT DOCUMENTS

| | | |
|---|---|---|
| EP | 0 883 199 | 12/1998 |
| EP | 1 100 134 | 5/2001 |
| JP | 11-283627 | 10/1999 |
| JP | 2000-36323 | 2/2000 |
| JP | 2000-215887 | 8/2000 |
| JP | 2000-311681 | 11/2000 |
| JP | 2001-256974 | 9/2001 |
| JP | 2002-151066 | 5/2002 |
| JP | 2002-352797 | 6/2002 |
| JP | 2002-352797 | 12/2002 |
| WO | 00/17949 | 3/2000 |
| WO | 03/018687 | 3/2003 |

LITHIUM SECONDARY BATTERY

This application is a divisional of application Ser. No. 10/808,481, filed Mar. 25, 2004, now abandoned, the contents of which are incorporated herein by reference.

BACKGROUND OF THE INVENTION

1. Field of the Invention

The present invention relates to a lithium secondary battery, more particularly improvement of the capacity and cycle-characteristic of a lithium secondary battery.

2. Related Background Art

The so-called lithium secondary batteries comprising a positive electrode with lithium cobaltate as a major active material, negative electrode with carbon as a major active material and an organic electrolyte solution have been put on the markets since the beginning of the 1990's. They have been rapidly spreading in the markets since then, because of their higher capacity than that of a conventional nickel/hydrogen secondary battery and sufficient cycle-characteristic to satisfy the market needs. At the same time, extensive works have been done to improve their characteristics and develop batteries of higher capacities.

As a result, the cylindrical battery of 18 mm in diameter and 65 mm in height, the so-called 18650 size, has now a capacity of 2,200 mAh at the highest, comparing with around 1,000 mAh recorded in the beginning of the 1990's. The greatly enhanced capacity results from improvements in a wide area including materials, e.g., lithium cobaltate and carbon as active materials, and designs.

However, it is considered that current capacity of a lithium ion secondary battery with lithium cobaltate and carbon as major active materials is close to the limit. Therefore, new active materials have been studied for the positive and negative electrode as another approach to higher capacity.

In particular, for the negative electrode active materials, metallic materials that can be alloyed with lithium, e.g., silicon and tin, have been studied as substitutes for carbon materials such as graphite. This is because they have greater theoretical capacities which are 3 to 10 times that of graphite such that while the theoretical capacity capable of charging/discharging of graphite is 372 mAh/g, a silicon alloy ($Li_{4.4}Si$) has a theoretical capacity of 4,199 mAh/g and a tin alloy ($Li_{4.4}Sn$) has a theoretical capacity of 993 mAh/g.

However, some metallic materials that can be alloyed with lithium involve their own problems to be solved, because they may expand during the alloying reaction process to increase the negative electrode volume several times, which tends to powder them, resulting in deterioration of their cycle-characteristic.

Several proposals have been made to solve these problems, as disclosed by U.S. Pat. Nos. 6,051,340, 5,795,679 and 6,432,585, Japanese Patent Application Laid-Open Nos. 11-283627 and 2000-311681 and WO 00/17949.

For example, U.S. Pat. No. 6,051,340 proposes a lithium secondary battery with a negative electrode comprising a current collector coated with an electrode layer, wherein the current collector is of a metal which is not alloyed with lithium, and the electrode layer comprises a metal which can be alloyed with lithium, such as silicon or tin and another metal which is not alloyed with lithium, such as nickel or copper.

U.S. Pat. No. 5,795,679 proposes a lithium secondary battery with a negative electrode formed of an alloy powder comprising an element such as nickel or copper and another element such as tin; and U.S. Pat. No. 6,432,585 a battery with a negative electrode whose electrode material layer contains at least 35% by weight of silicon or tin particles having an average particle diameter of 0.5 to 60 μm, a void ratio of 0.10 to 0.86 and a density of 1.00 to 6.56 $g/cm^3$.

Japanese Patent Application Laid-Open No. H11-283627 proposes a lithium secondary battery with a negative electrode containing silicon or tin having an amorphous phase; and Japanese Patent Application Laid-Open No. 2000-311681 a lithium secondary battery with a negative electrode composed of amorphous tin/transition metal alloy particles of a non-stoichiometric composition. WO 00/17949 discloses a lithium secondary battery with a negative electrode composed of amorphous silicon/transition metal alloy particles of a non-stoichiometric composition.

Moreover, Japanese Patent Application Laid-Open No. 2000-215887 proposes a lithium secondary battery whose capacity and charge/discharge efficiency are improved by suppressing the volume expansion during alloying with lithium to prevent the breakage of the negative electrode, wherein chemical vapor deposition involving pyrolysis of benzene or the like is used to solve the above problems by forming a carbon layer on the surface of particles of a metal or semi-metal, in particular silicon, which can be alloyed with lithium, to improve its electroconductivity.

These inventions have disclosed compositions and constituents of silicon or its alloys, and performance of the electrode that comprises the above material. It should be noted, however, that a battery exhibits its inherent functions when its negative electrode works in combination with a positive electrode, both contained in a battery can. For a battery to exhibit its intended functions, it is essential to design a battery of high capacity and cycle-characteristic by allowing a negative electrode mainly composed of a metallic material which can be alloyed with lithium to effectively function in a battery can in combination with a positive electrode.

Japanese Patent Application Laid-Open No. 2002-352797 proposes a lithium secondary battery of high capacity and cycle-characteristic by controlling utilization of a negative electrode comprised of silicon at a certain level or less. However, it only discloses silicon coated with carbon for a negative electrode, discussing that recommended electrical storage capacity (hereinafter, simply referred to as "storage capacity" or "capacity") per unit weight of a negative electrode active material layer is 1,000 mAh/g, but is silent on conditions for extending the life of a battery having a capacity exceeding 1,000 mAh/g.

In other words, few have sufficiently discussed optimum electrode and battery designs that allow a battery to exhibit a high capacity and a long cycle life when it comprises a negative electrode of a high capacity per unit weight of a negative electrode active material layer exceeding 1,000 mAh/g working in combination with a positive electrode.

SUMMARY OF THE INVENTION

The present invention has been accomplished in the light of the above-mentioned situation, and it is an object of the present invention to provide a lithium secondary battery having a high capacity and a long life and so designed as to exhibit these characteristics at the same time.

The present invention provides a lithium secondary battery with a negative electrode comprising a negative electrode active material layer comprising alloy particles comprising silicon and tin and having an average particle diameter of 0.05 to 2 μm as an active material, and a current collector, wherein the negative electrode active material layer has a storage capacity of 1,000 to 2,200 mAh/g and a density of 0.9 to 1.5 g/cm³.

The present invention also provides a lithium secondary battery comprising a negative electrode comprising a negative electrode active material layer comprising alloy particles as an active material comprising silicon as a major component and a negative electrode current collector, and a positive electrode comprising a positive electrode active material layer and a positive electrode current collector, wherein the positive electrode active material layer and the negative electrode active material layer satisfy the following relationships:

$$(C_N \times D_N)/(C_P \times D_P) \leq 8$$

$$C_N \times D_N = 1,200 \text{ to } 2,500 \text{ mAh/cm}^3$$

$$C_N = 1,000 \text{ to } 2,200 \text{ mAh/g}$$

$$D_N = 0.9 \text{ to } 1.5 \text{ g/cm}^3$$

wherein, $C_N$ represents a capacity per unit weight of the negative electrode active material layer;

$D_N$ represents the density of the negative electrode active material layer;

$C_P$ represents a capacity per unit weight of the positive electrode active material layer; and $D_P$ represents the density of the positive electrode active material layer.

In the present invention, it is preferred that the alloy particles comprising silicon as a major component have an average particle diameter of 0.05 to 2 μm.

In the present invention, it is also preferred that the alloy particles comprising silicon as a major component are alloy particles comprising silicon and tin.

DETAILED DESCRIPTION OF THE PREFERRED EMBODIMENTS

The preferred embodiments of the present invention will be described by referring to the attached drawings.

The present inventors have developed a negative electrode with an unprecedentedly high capacity by using alloy particles as an active material comprising silicon as a major component, and found those electrode conditions under which the electrode performance (including cycle-characteristic) and the capacity are well-balanced. Further, they have found the optimum electrode and battery design conditions which allow a battery with a negative electrode of high capacity working in combination with a positive electrode to exhibit high capacity and long life. The secondary batteries of preferred embodiments of the present invention will be described in detail.

Figure 1:
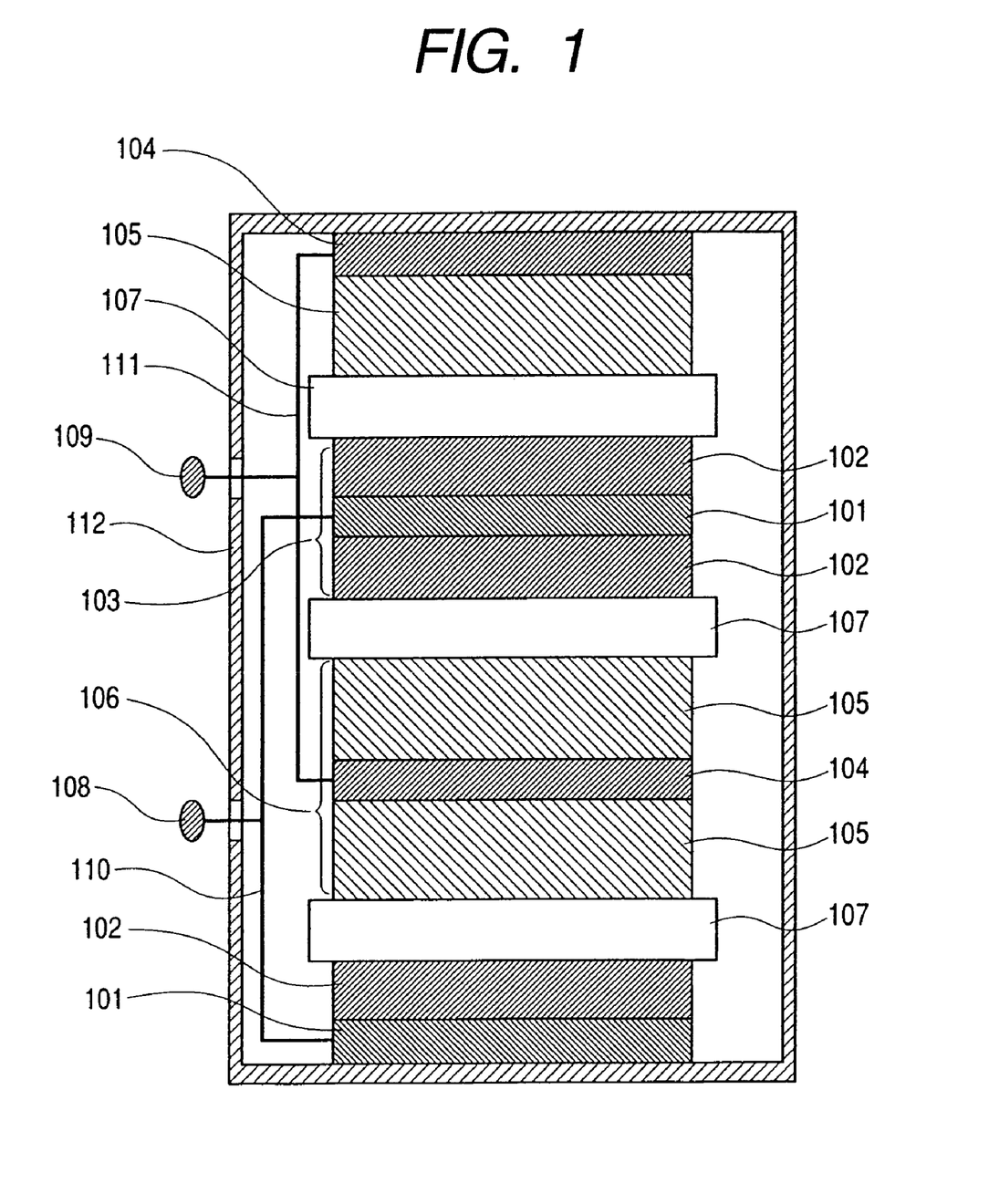
FIG. 1 is a sectional view schematically showing an embodiment of the secondary battery (lithium secondary battery) of the present invention.

FIG. 1 is a sectional view schematically showing an embodiment of the secondary battery (lithium secondary battery) of the present invention. In the lithium secondary battery, a negative electrode 103 comprising a negative electrode active material layer 102 comprising alloy particles as an active material comprising silicon as a major component and formed on a negative electrode current collector 101, and a positive electrode 106 comprising a positive electrode active material layer 105 comprising lithium-containing transition metal oxide as an active material and formed on a positive electrode current collector 104 are stacked in opposition to each other via an ion conductor 107 and contained in a battery case 112, and the negative electrode 103 is connected to a negative electrode terminal 108 via a negative electrode lead 110 and the positive electrode 106 is connected to a positive electrode terminal 109 via a positive electrode lead 111.

The present inventors have developed a negative electrode with a high capacity and a good cycle-characteristic by using alloy particles as an active material comprising silicon as a major component, and found the optimum capacity and density for battery design.

Figure 2:
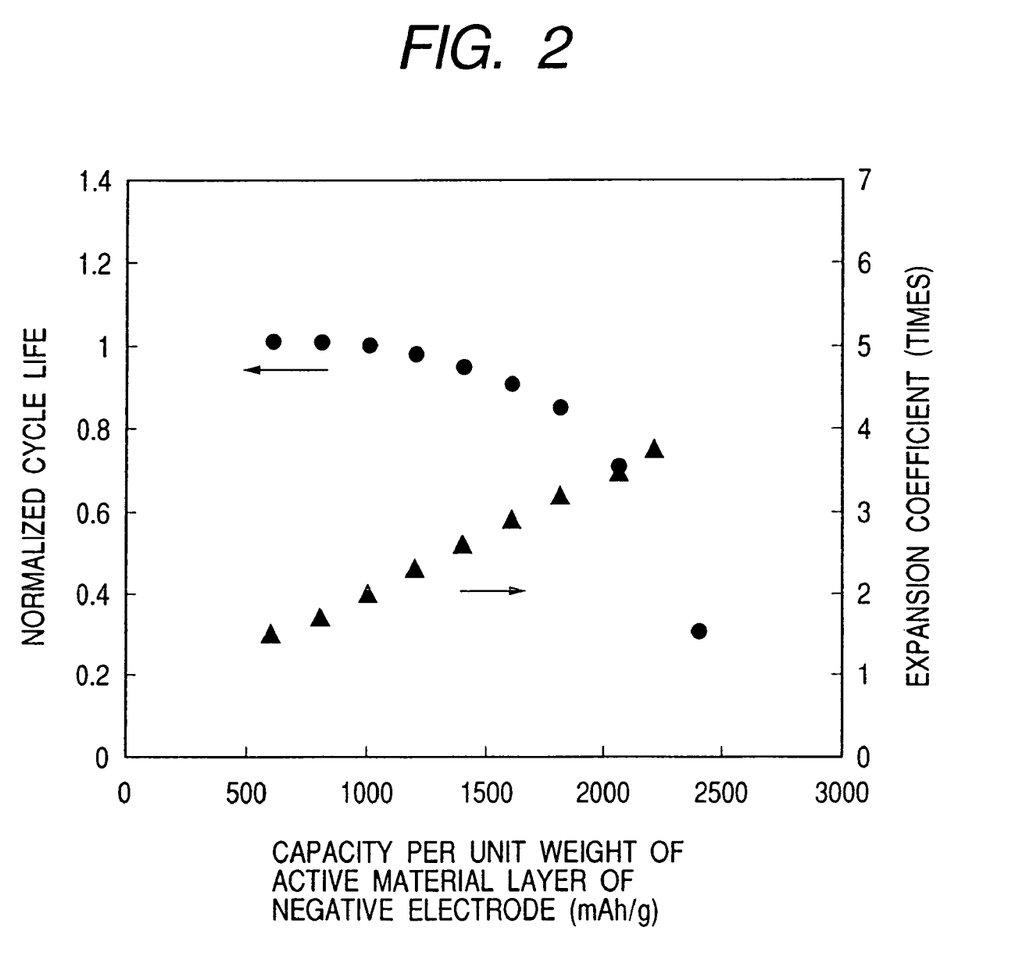
FIG. 2 is a graphical representation showing the relationship between the capacity per unit weight (inserted Li amount) and the changes in cycle life and expansion coefficient of the negative electrode active material layer of the above-mentioned secondary battery wherein a silicon/tin alloy powder is used as an active material.

FIG. 2 is a view illustrating the relationship between the capacity per unit weight (inserted Li amount) and the changes in cycle life and expansion coefficient of a negative electrode active material layer 102 using a silicon/tin alloy powder an active material having an average particle diameter of 0.05 to 2 μm is used as an example of the alloy.

The battery was evaluated by the charging/discharging test, wherein the negative electrode 103 was used as a cathode and metallic lithium was used as an anode in an electrolyte solution of 1 M (mol/L) prepared by dissolving lithium hexafluorophosphate (LiPF$_6$) in a mixture of ethylene carbonate (EC) and diethyl carbonate (DEC) in equivalent amounts.

The charging/discharging test was carried out with a cycle consisting of a Li insertion/release reaction at a current density of 1 mA/cm² and a 20-minutes resting period being defined as one cycle. The Li insertion reaction was cut off at a given capacity or 0 V, and the Li release reaction was carried out with the cut-off voltage being set to 1.2 V. Incidentally, the electrode exhibited a storage capacity of 2,400 mAh/g at the maximum by continuing the Li insertion reaction to 0 V.

The expansion coefficient was measured after the Li insertion reaction in a first cycle, and the cycle life was evaluated on the basis of the number of cycles in which the capacity did not reach 60% of the given capacity. Incidentally, the life shown in FIG. 2 was values normalized with the number of cycles at a given capacity of 1,000 mAh/g being defined as 1.0.

Figure 3:
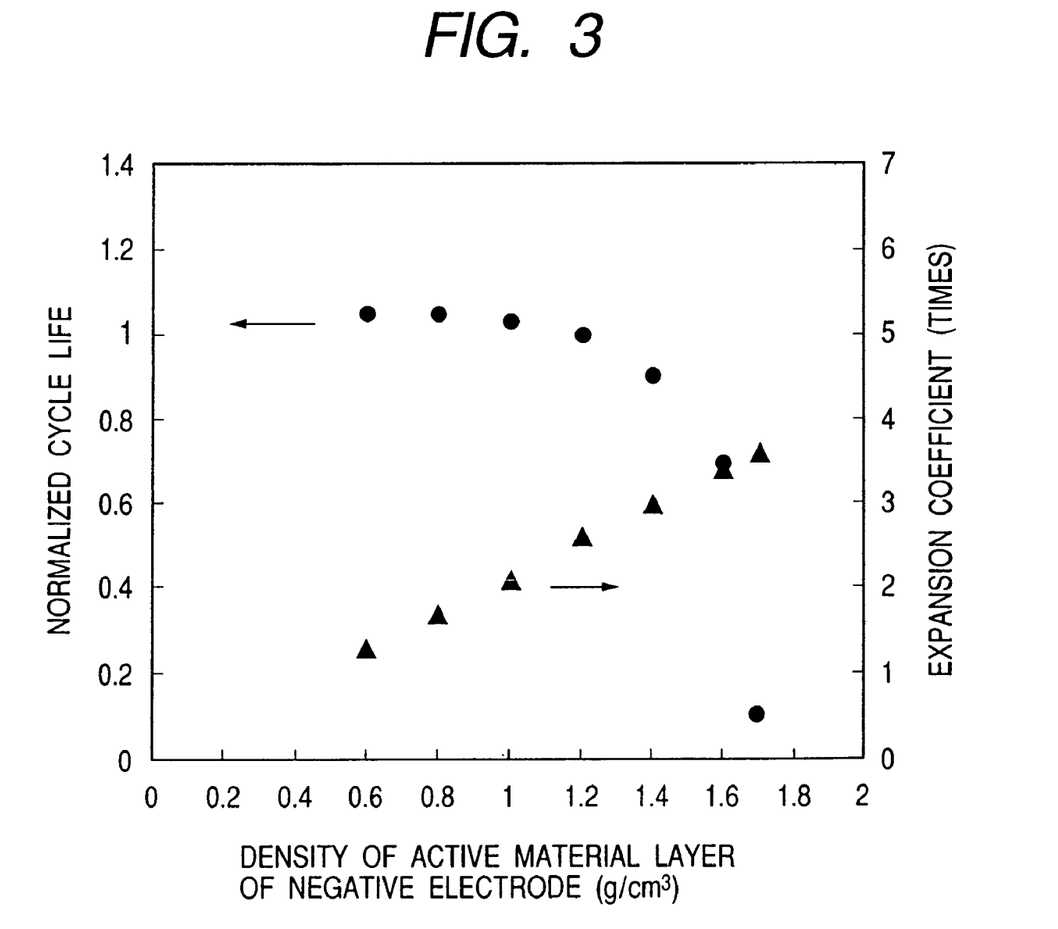
FIG. 3 is a graphical representation showing the relationship between the density and the changes in cycle life and expansion coefficient of the negative electrode active material layer of the above-mentioned secondary battery wherein a silicon/tin alloy powder is used as an active material.

FIG. 3 is a view illustrating the relationship between the density of a negative electrode active material layer 102 and the changes in cycle life and expansion coefficient when effecting charging and discharging at a capacity per unit weight of the negative electrode active material layer 102 1,400 mAh/g. The evaluation was carried out in the same manner as that described for FIG. 2. Further, the life shown in FIG. 3 was values normalized with the number of cycles at a density of 1.0 g/cm³ being defined as 1.0.

It can be seen from the results shown in FIGS. 2 and 3 that the expansion coefficient of the negative electrode active material layer 102 using a silicon/tin alloy powder as an active material becomes greater as the capacity increases (i.e., as the quantity of lithium inserted increases) and as the density of the negative electrode active material layer 102 increases. Thus, there is a tendency that the negative electrode active material layer 102 is liable to generate strain or cracks to reduce the current collectability, thereby deteriorating the cycle-characteristic. Conversely, there is a tendency that the expansion coefficient becomes smaller as the capacity decreases (i.e., as the quantity of lithium inserted decreases) and as the density of the negative electrode active material layer 102 decreases, thereby improving the cycle-characteristic.

These results lead to the conclusion that the preferable capacity per unit weight of the negative electrode active material layer 102 is within the range of 1,000 to 2,200 mAh/g. The reason is that exceeding 2,200 mAh/g significantly deteriorates the cycle-characteristic due to expansion, which is not desirable. Further, although there are cases where priority is given to improvement in the cycle-characteristic at some degree of sacrifice of the capacity, no improvement in the cycle-characteristic is expected at a capacity below 1,000 mAh/g. Incidentally, the preferable capacity per unit weight of the active material is within the range of 1,500 to 3,000 mAh/g, although varying depending on the composition of the active material layer.

On the other hand, the preferable density of the negative electrode active material layer 102 is within the range of 0.9 to 1.5 g/cm$^3$. The reason is that exceeding 1.5 g/cm$^3$ significantly deteriorates the cycle-characteristic due to expansion, which is not desirable. Further, when the density is degreased, the battery capacity inevitably decreases. Incidentally, although there are cases where priority is given to improvement in the cycle-characteristic at some degree of sacrifice of the battery capacity, no improvement in the cycle-characteristic has been attained at a density below 0.9 g/cm$^3$.

Thus, the present inventors have found from the results shown in FIGS. 2 and 3 that the capacity per unit volume of the negative electrode active material layer 102 expressed by a product of capacity per unit weight and density is preferably within the range of 900 to 3,300 mAh/cm$^3$, more preferably 1,200 to 2,500 mAh/cm$^3$. The reason is that exceeding 2,500 mAh/cm$^3$ significantly deteriorates the cycle-characteristic due to expansion, and that although there are cases where priority is given to improvement in the cycle-characteristic at some degree of sacrifice of the capacity, no improvement in the cycle-characteristic has not been attained at a capacity below 1,200 mAh/cm$^3$.

In addition, based on the results shown in FIGS. 2 and 3, the present inventors have found as a second specific feature of the present invention that the negative electrode comprising alloy particles as an active material comprising silicon as a major component to provide the above-mentioned high capacity can work in combination with a positive electrode to fully exhibit its inherent functions, by designing the positive electrode active material layer 105 and the negative electrode active material layer 102 so as to satisfy the following relationships:

$(C_N \times D_N)/(C_P \times D_P) \leq 8$ $C_N \times D_N = 1,200$ to $2,500$ mAh/cm$^3$ $C_N = 1,000$ to $2,200$ mAh/g $D_N = 0.9$ to $1.5$ g/cm$^3$ wherein, $C_N$ represents a capacity per unit weight of the negative electrode active material layer;

$D_N$ represents the density of the negative electrode active material layer;

$C_P$ represents a capacity per unit weight of the positive electrode active material layer; and $D_P$ represents the density of the positive electrode active material layer.

A combination of the positive electrode active material layer 105 and the negative electrode active material layer 102 that satisfy the above relationships can provide a battery of a high capacity and an excellent cycle-characteristic.

Figure 4:
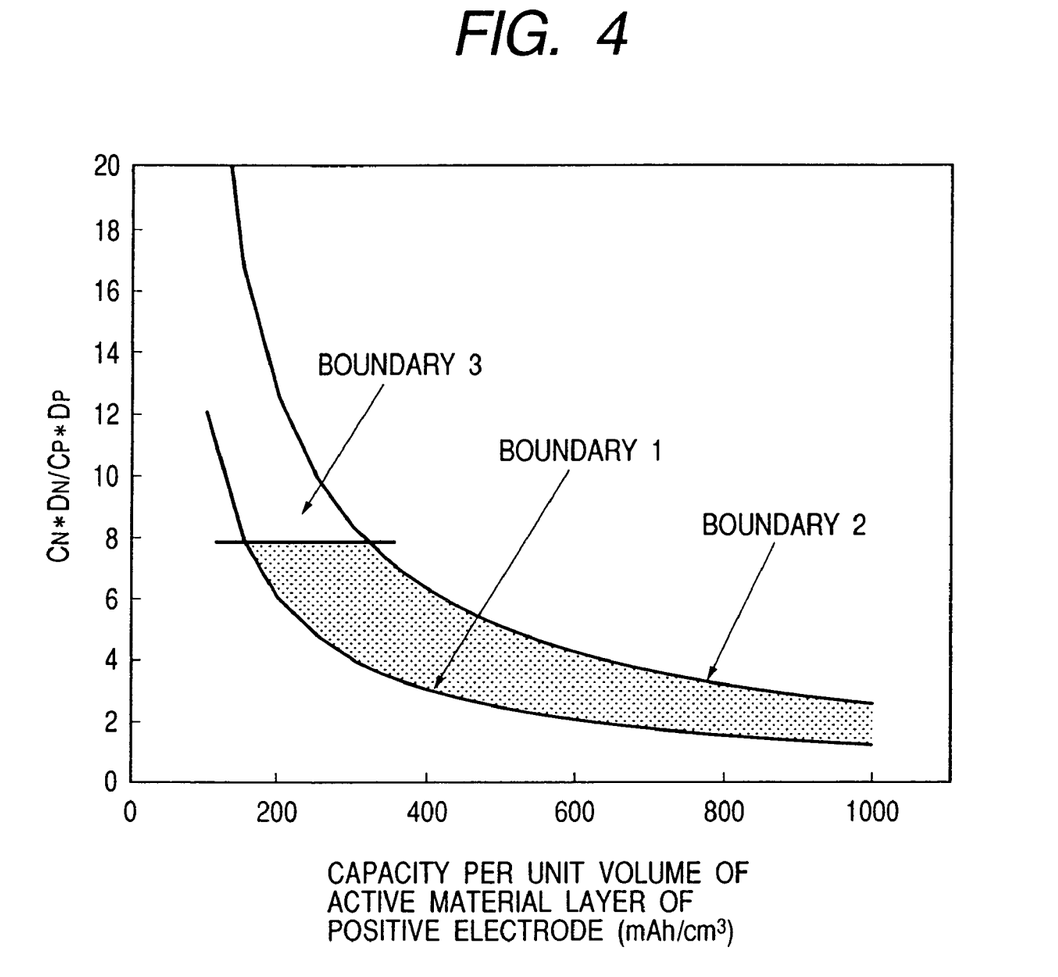
FIG. 4 is a view showing the design range for the positive electrode active material layer and the negative electrode active material layer of the above-mentioned secondary battery.

FIG. 4 is a view illustrating these relationships in detail, where the area enclosed by the boundaries 1 to 3 is a range in which a battery of a high capacity and an excellent cycle-characteristic can be provided. Incidentally, in FIG. 4, the abscissa indicates a capacity per unit volume of the positive electrode active material layer that can be repeatedly charged and discharged, represented by $C_P \times D_P$, and the ordinate indicates $(C_N \times D_N)/(C_P \times D_P)$.

Here, the term "capacity per unit volume of the positive electrode active material layer 105 that can be repeatedly charged and discharged" means a reaction region in which the charge/discharge cycles are well carried out and obtained as a product of the capacity per unit weight and the density of the positive electrode active material layer 105. Further, the capacity per unit weight of the positive electrode active material layer 105 can be determined by the capacity per unit weight of the positive electrode active material that can be repeatedly charged and discharged and the compositional ratio by weight of the positive electrode active material contained in the positive electrode active material layer 105.

For example, the positive electrode active material layer 105 that can be repeatedly charged and discharged of the cobalt-, nickel- and manganese-type lithium-containing transition metal oxides, which can provide a high voltage, is practically used at a capacity per unit volume of 200 to 700 mAh/cm$^3$, a capacity per unit weight of 80 to 200 mAh/g and a density of 2.5 to 3.5 g/cm$^3$.

More specifically, as the active material layer using these lithium-containing transition metal oxides used for commercially available batteries, an LiCoO$_2$ active material layer is practically used at a capacity per unit weight of 140 to 160 mAh/g and a density of 3.0 to 3.5 g/cm$^3$; an LiNiO$_2$ active material layer, which has a higher theoretical capacity than that of LiCoO$_2$, is practically used at a capacity per unit weight of 170 to 200 mAh/g and a density of 2.8 to 3.2 g/cm$^3$, and an LiMn$_2$O$_4$ active material layer is practically used at a capacity per unit weight of 80 to 120 mAh/g and a density of 2.5 to 3.0 g/cm$^3$ for.

The boundary 1 represents the values of $(C_N \times D_N)/(C_P \times D_P)$ vs. $C_P \times D_P$ that is the capacity per unit volume of the positive electrode active material layer which can be repeatedly charged and discharged when the $C_N \times D_N$ is the minimum value 1,200 mAh/cm$^3$. Although there are cases where priority is given to the cycle-characteristic at the sacrifice of capacity to some extent, any value below the boundary 1 is not desirable, because no improvement in the cycle-characteristic is expected and the high capacity performance of the negative electrode cannot be fully exhibited.

The boundary 2 represents the values of $(C_N \times D_N)/(C_P \times D_P)$ vs. $C_P \times D_P$ that is the capacity per unit volume of the positive electrode active material layer which can be repeatedly charged and discharged when the $C_N \times D_N$ is the maximum value 2,500 mAh/cm$^3$. Any value exceeding the boundary 2 is not desirable, because the cycle-characteristic lowers.

The boundary 3 represents $(C_N \times D_N)/(C_P \times D_P)=8$. Values on or below the boundary 3 can provide a more stable battery and hence are preferable. The reason is as described below. Generally, the positive electrode active material layer 105 and the negative electrode active material layer 102 facing each other satisfy the following relationship.

$$C_N \times D_N \times T_N = C_P \times D_P \times T_P \quad \text{Equation 1}$$

The following Equation 2 is derived from Formula 1.

$$(C_N \times D_N)/(C_P \times D_P) = T_P/T_N \quad \text{Equation 2}$$

In the above equations, $T_N$ represents the thickness of the negative electrode active material layer 102; $C_N$ the capacity per unit weight of the negative electrode active material layer 102; $D_N$ the density of the negative electrode active material layer 102; $T_P$ the thickness of the positive electrode active material layer 105; $C_P$ the capacity per unit weight of the positive electrode active material layer 105; and $D_P$ the density of the positive electrode active material layer 105.

As is seen from Equation 2, the $(C_N \times D_N)/(C_P \times D_P)$ can be represented in terms of the ratio of the active material layers $T_P/T_N$. The practical thickness of the positive electrode active material layer 105 in consideration of the battery characteristics, adhesion to the current collector and productivity, is 150 μm or less, more preferably 100 μm or less. With this positive electrode active material layer 105, if the boundary 3 is exceeded, the negative electrode active material layer 102 is too thin, which makes it difficult to effect uniform coating in mass production to lower the productivity. Further, during electrode group formation steps such as stacking or rolling, rolling in a skewed fashion or the like is liable to occur. Therefore, the $(C_N \times D_N)/(C_P \times D_P)$ value is preferably 8 or less.

As described above, as long as the conditions defined by the present invention and shown in FIG. 4 are satisfied, it is possible to stably provide a battery suitable for a specified object of use, such as a battery featuring a high capacity while securing the life to a certain extent, or a battery featuring a long life while still having a higher capacity than a commercially available battery with a graphite negative electrode.

Next, the negative electrode 103, negative electrode current collector 101, negative electrode terminal 108, positive electrode 106, positive electrode current collector 104, positive electrode terminal 109, and ion conductor 107 of the secondary battery (lithium secondary battery) mentioned above with reference to FIG. 1 will be described.

(Negative Electrode 103)

The negative electrode 103 is generally consisted of the negative electrode current collector 101, and the negative electrode active material layers 102 formed on both sides of the negative electrode current collector 101. The negative electrode active material layer 102 is constituted of alloy particles mainly composed of silicon, a conductive auxiliary material, other additives, and a binder for holding the active material layers on each other or for holding the active material layer on the current collector.

For example, the negative electrode active material layer 102 is formed by suitably adding a conductive auxiliary material and a binder to the alloy particles mainly comprised of silicon, followed by mixing, application and pressure forming. Further, it is preferable to add a solvent to the above mixture to prepare a paste, for facilitating the application. As the application method, a coater coating method or screen printing method may be used.

Alternatively, the negative electrode active material layers 102 can be formed on the current collector by pressing and forming the negative electrode main material, a conductive auxiliary material and a binder on the current collector without addition of a solvent, or pressing and forming the negative electrode main material and a conductive auxiliary material on the current collector without addition of a binder. Incidentally, the content of the alloy particles mainly composed of silicon in the negative electrode active material layer 102 is preferably 40 to 90% by weight.

As the active material of the negative electrode 103, there are preferably used an alloy powder mainly composed of silicon that are stable in an electrolyte solution and capable of insertion/release of lithium. It is important that the composition of the alloy powder mainly composed of silicon is such that the silicon content is preferably 50 atomic % or more, more preferably 50% by weight or more. As component elements other than silicon of the silicon alloy, there is preferably used at least one element selected from the group consisting of tin, aluminium, zinc, germanium, indium, antimony, titanium, chromium, lead, copper, nickel, cobalt and iron.

These alloy powders are preferably amorphous. The average diameter of the alloy particles is preferably 2 μm or less, more preferably 0.9 μm or less, and more preferably 0.05 μm or more.

The binder used in the present invention is not particularly limited, so long as it is electrochemically and chemically stable and is adhesive. Examples of the binder include water-insoluble polymers such as polyolefins such as polyethylene and polypropylene, fluororesins such as polyvinylidene fluoride, tetrafluoroethylene polymer and vinylidene fluoride-hexafluoropropylene copolymer, polyethylene-polyvinyl alcohol copolymer, and styrene-butadiene rubber; and water-soluble polymers such as polyvinyl alcohol, polyvinyl butyral, polyvinyl methyl ether, polyvinyl ethyl ether, polyvinyl isobutyl ether, carboxymethylcellulose, hydroxyethylcellulose, hydroxypropylcellulose, hydroxymethylethylcellulose, polyethylene glycol, and styrene-butadiene rubber.

A preferable water-soluble polymer is a mixture of polyvinyl alcohol and a cellulosic polymer, preferably carboxymethylcellulose.

Here, the content of the binder in the active material layer is preferably 1 to 20% by weight in order to hold a larger quantity of the active material at the time of charging, and more preferably 5 to 15% by weight. This is because the alloy powder more expands than carbon powder during charging, so that a greater binding force is needed.

As the conductive auxiliary material, there is preferably used those materials which are electrochemically and chemically stable and whose conductivity is as large as possible. Preferable examples of the conductive auxiliary material include carbon powder (in particular graphite powder), copper powder, nickel powder, aluminium powder and titanium powder.

(Negative Electrode Current Collector 101)

The material of the negative electrode current collector 101 needs to be electrochemically and chemically stable, highly conductive, and not alloyed with lithium and includes, for example, copper, nickel, stainless steel and titanium. The current collector may be sheet-shaped, net-shaped, expanded, perforated or spongy. The current collector is preferably 6 to 30 μm in thickness. When the thickness is less than 6 μm, although the battery capacity will increase, the resistance of the current collector will increase to result in an increase of internal resistance, a lowering in output, which is not desirable. On the other hand, when the thickness is more than 30 μm, the battery capacity will decrease, which is also not desirable.

(Negative Electrode Terminal 108)

The material of the negative electrode terminal 108 includes copper, nickel and stainless steel, as is the case with the negative electrode current collector 101. The method of connecting the negative electrode current collector 101 and the negative electrode terminal 108 to each other includes laser welding, resistance welding, ultrasonic welding or the like, and is suitably selected depending on the material used.

(Positive Electrode 106)

The positive electrode 106 is generally constituted of the positive electrode current collector 104, and the positive electrode active material layers 105 formed on both sides of the positive electrode current collector 104. The positive electrode active material layer 105 is constituted of an active material powder capable of insertion/release of lithium, a conductive auxiliary material, other additives, and a binder for holding the active material powder on each other or for holding the active material powder on the current collector.

Here, the thickness of the positive electrode active material layer 105 to be formed on one side of the positive electrode current collector 104 is preferably 50 to 150 μm. Incidentally, when the thickness is less than 50 μm, because the capacity per unit volume of the negative electrode active material layer 102 is greater than that of the positive electrode active material layer 105, the thickness of the opposing negative electrode active material layer 102 becomes too small to cause difficulty in coating, which is not desirable. On the other hand, when the thickness is more than 150 μm, a lowering in the adhesion with the positive electrode current collector 104 or a lowering in the output characteristic resulting from increase in polarization arises, which is not desirable.

On the other hand, the density of the positive electrode active material layer 105 is preferably 2.5 to 3.5 g/cm$^3$. When the density is less than 2.5 g/cm$^3$, the capacity increase of the battery cannot be achieved, which is not desirable. On the contrary, when the density is more than 3.5 g/cm$^3$, the electrolyte solution cannot effect sufficient penetration or the active material layer is cracked to drop off from the current collector when rolling the electrodes, which is also not desirable.

Incidentally, the active material of the positive electrode 106 is not particularly limited so long as it is stable in the electrolyte solution and capable of insertion/release of lithium and includes, for example, transition metal oxides, transition metal sulfides, transition metal nitrides, lithium-containing transition metal oxides, lithium-containing transition metal sulfides, lithium-containing transition metal nitrides, and lithium-containing transition metal phosphates, as preferable ones. Of these, lithium-containing transition metal oxides are more preferred. The transition metal element for the transition metal oxides, transition metal sulfides, transition metal nitrides or transition metal phosphates includes, for example, metal elements having a d-shell or f-shell, i.e., Sc, Y, lanthanoids, antinodes, Ti, Zr, Hf, V, Nb, Ta, Cr, Mo, W, Mn, Tc, Re, Fe, Ru, Os, Co, Rh, Ir, Ni, Pd, Pt, Cu, Ag, and Au. In particular, Mn, Fe, Co and Ni of the first transition series metals are preferably used. More specifically, $LiCoO_2$, $LiNiO_2$, $LiMn_2O_4$, $LiMnO_2$, $LiCo_{0.2}Bi_{0.8}O_2$, $LiNi_{0.5}Mn0.5O_2$ and the like may be used.

The binder is not particularly limited, so long as it is electrochemically and chemically stable and is adhesive. Widely used examples of the binder include fluororesins such as polytetrafluoroethylene and polyvinylidene fluoride, and cellulose-type ones such as carboxymethylcellulose and vinyl acetate-type ones such as polyvinyl alcohol are also used.

As the conductive auxiliary material, there is preferably used those materials which are electrochemically and chemically stable and whose conductivity is as large as possible. Preferable examples of the conductive auxiliary material include carbon powder (in particular graphite powder), aluminium powder and titanium powder.

(Positive Electrode Current Collector 104)

The material of the positive electrode current collector 104 needs to be electrochemically and chemically stable and highly conductive, and includes, for example, aluminium and titanium. The current collector may be sheet-shaped, net-shaped, expanded, perforated or spongy. The positive electrode current collector 104 is preferably 6 to 30 μm in thickness. Incidentally, when the thickness is less than 6 μm, although the battery capacity will increase, the resistance of the positive electrode current collector 104 will increase to result in an increase of internal resistance, a lowering in output, which is not desirable. On the other hand, when the thickness is more than 30 μm, the battery capacity will decrease, which is also not desirable.

(Positive Electrode Terminal 109)

The material of the positive electrode terminal 109 includes aluminium and titanium, as is the case with the positive electrode current collector 104 of the positive electrode 106. The method of connecting the positive electrode current collector 104 of the positive electrode 106 and the positive electrode terminal 109 to each other includes laser welding, resistance welding, ultrasonic welding or the like, and is suitably selected depending on the material used.

(Positive Electrode Terminal 109)

Materials for the positive electrode terminal 109 include aluminum and titanium, as is the case with the current collector 104 for the positive electrode 106. The current collector 104 for the positive electrode 106 may be electrically connected to the terminal 109 by laser-aided welding, resistance welding, ultrasonic welding or the like, depending on the material.

(Ion Conductor 107)

As the ionic conductor 107 of the lithium secondary battery of the present invention, lithium ion conductors such as a separator holding an electrolyte solution (electrolyte solution prepared by dissolving an electrolyte in a solvent), a solid electrolyte, or a solidified electrolyte obtained by gelling an electrolyte solution with a polymer gel can be used.

The conductivity of the ionic conductor 107 used in the secondary battery of the present invention at 25° C. is preferably $1\times10^{-3}$ S/cm or more, and more preferably $5\times10^{-3}$ S/cm or more. Further, the thickness of the ionic conductor 107 is preferably 10 to 40 μm. When the thickness is less than 10 μm, the stress resulting from expansion of the negative electrode 103 cannot be absorbed, which is not desirable. On the other hand, when the thickness is more than 40 μm, the capacity will lower, which is also not desirable.

As the electrolyte, there may be included, for example, acids such as $H_2SO_4$, HCl or $HNO_3$; salts of lithium ion ($Li^+$) and Lewis acid ion ($BF_4^-$, $PF_6^-$, $AsF_6^-$, $ClO_4^-$, $CF_3SO_3^-$ or $BPh_4^-$ (Ph: phenyl group)); and a mixture thereof. The salt is preferably treated to sufficiently remove moisture and oxygen by heating under a vacuum or the like.

As a solvent for the electrolyte, there may be included, for example, acetonitrile, benzonitrile, propylene carbonate, ethylene carbonate, dimethyl carbonate, diethyl carbonate, ethylmethyl carbonate, dimethyl formamide, tetrahydrofuran, nitrobenzene, dichloroethane, diethoxyethane, 1,2-dimethoxyethane, chlorobenzene, γ-butyrolactone, dioxolane, sulfolane, nitromethane, dimethyl sulfide, dimethyl sulfoxide, methyl formate, 3-methyl-2-oxazolidinone, 2-methyltetrahydrofulan, 3-propylsydnone, sulfur dioxide, phosphoryl chloride, thionyl chloride, sulfuryl chloride or a liquid mixture thereof.

Incidentally, it is preferable to either dehydrate the above-mentioned solvent, for example, with activated alumina, molecular sieve, phosphorus pentoxide or calcium chloride, or depending on the solvent, to distill the solvent in an inert gas atmosphere in the presence of an alkaline metal for elimination of impurities and dehydration.

Further, in order to prevent leakage of the electrolyte solution, it is preferable to use a solid electrolyte or a solidified electrolyte. Here, the solid electrolyte may include a glass material such as an oxide comprising lithium, silicon, oxygen, and phosphorus or sulfur elements, a polymer complex of an organic polymer having an ether structure. Further, the solidified electrolyte is preferably obtained by gelling the above electrolyte solution with a gelling agent to solidify the electrolyte solution. It is desirable to use as the gelling agent a polymer that can absorb the solvent of the electrolyte solution to swell, or a porous material capable of absorbing a large amount of liquid, such as silica gel.

As the polymer, there may be used polyethylene oxide, polyvinyl alcohol, polyacrylonitrile, polymethylmethacrylate, vinylidenefluoride-hexafluoropropylene copolymer, and the like. Further, it is more preferred that the polymers have a cross-linking structure.

The ionic conductor 107 constituting the separator which plays the role of preventing short-circuiting between the negative electrode 103 and the positive electrode 106 in the secondary battery may also have a role of retaining the electrolyte solution and is required to have a large number of fine pores through which lithium ions can pass and to be insoluble and stable in the electrolyte solution.

Accordingly, as the separator, there are preferably used, for example, a nonwoven fabric or a micropore structure material of glass, a polyolefin such as polypropylene or polyethylene, a fluororesin, etc. Alternatively, a metal oxide film having micropores or a resin film complexed with a metal oxide may also be used.

Now, the shape and structure of the secondary battery will be explained.

The specific shape of the secondary battery according to the present invention may be, for example, a flat shape, a cylindrical shape, a rectangular parallelepiped shape, a sheet shape or the like. Further, the structure of the battery may be, for example, a single layer type, a multiple layer type, a spiral-wound type or the like. Of those, a spiral-wound type cylindrical battery permits an enlarged electrode surface area by rolling a separator that is sandwiched between a negative electrode and a positive electrode, thereby being capable of supplying a large current at the time of charging/discharging. Furthermore, batteries having a rectangular parallelepiped shape or sheet shape permit effective utilization of accommodation space in appliances that will be configured by accommodating a plurality of batteries therein.

Figure 5:
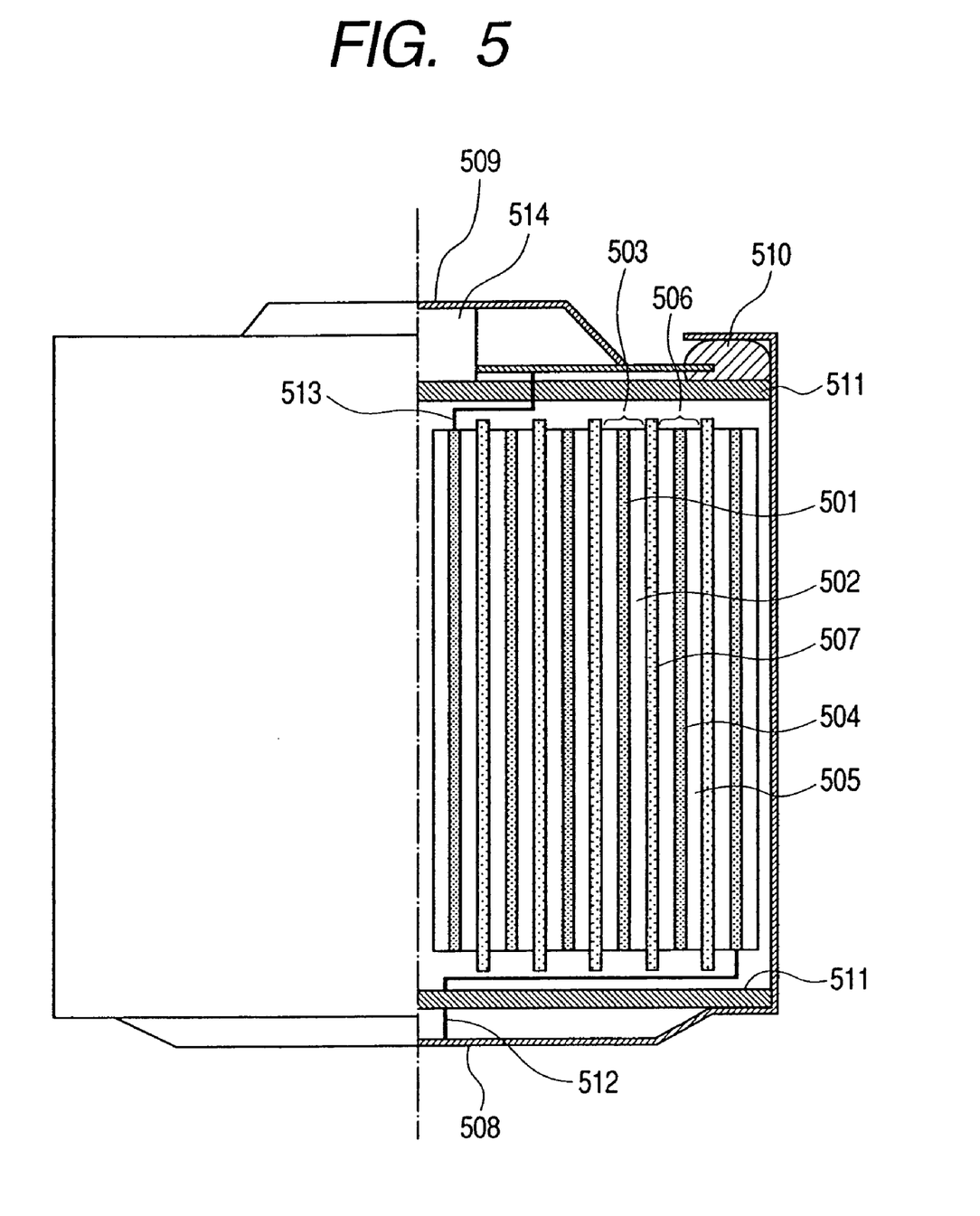
FIG. 5 is a sectional view showing the structure of a spiral-wound type cylindrical battery as one embodiment of the above-mentioned secondary battery.

Now, description will be made in more detail of the shape and structure of the battery with reference to FIG. 5. FIG. 5 is a sectional view of a spiral-wound type cylindrical battery. Incidentally, the lithium secondary battery of this shape generally comprise the same structure as that illustrated in FIG. 1, and has a negative electrode, a positive electrode, an ionic conductor, a battery housing and an output terminal.

In FIG. 5, reference numeral 502 denote a negative electrode active material layer, 503 a negative electrode, 506 a positive electrode, 508 a negative electrode terminal (negative electrode can), 509 a positive electrode terminal (positive electrode cap), 507 an ionic conductor, 510 a gasket, 501 a negative electrode current collector, 504 a positive electrode current collector, 511 an insulating plate, 512 a negative electrode lead, 513 a positive electrode lead, and 514 a safety valve.

Here, in this spiral-wound type cylindrical secondary battery, the positive electrode 506 having the positive electrode active material layer 505 formed on the positive electrode current collector 504 and the negative electrode 503 having the negative electrode active material layer 502 formed on the negative electrode current collector 501 are provided in opposition to each other via the ionic conductor 507 formed by a separator that retains at least an electrolyte solution therein so as to form a stack of a cylindrical structure rolled up multiple times. Further, the cylindrical stack is accommodated in the negative electrode can 508 used as the negative electrode terminal.

Furthermore, the positive electrode cap 509 is disposed as the positive electrode terminal on a side of an opening of the negative electrode can 508 and a gasket 510 is disposed in the remaining parts of the negative electrode can 508. Thus, the cylindrical electrode stack is isolated from the positive electrode cap side via the insulating plate 511.

Incidentally, the positive electrode 506 is connected to the positive electrode cap 509 by way of the positive electrode lead 513. Further, the negative electrode 503 is connected to the negative electrode cap 508 by way of the negative electrode lead 512. The safety valve 514 is disposed on the side of the positive electrode cap 509 to adjust the internal pressure of the battery.

Next, an example of assembling procedures for the battery shown in FIG. 5 will be described.

(1) The ionic conductor 507 as a separator is sandwiched between the negative electrode 503 and the formed positive electrode 506, and assembled into the negative electrode can 508.

(2) After injection of the electrolyte solution, the positive electrode cap 509 is assembled with the gasket 510.

(3) The assembly obtained in (2) above is caulked.

The battery is completed in this way. Incidentally, it is preferable that the above-described preparation of the materials for the lithium battery and assembly of the battery is carried out in dry air from which moisture has been removed sufficiently or in a dry inert gas.

Next, the gasket 510, housing and safety valve 514 constituting the above-mentioned lithium secondary battery will be described.

(Gasket 510)

As the material of the gasket 510, there may be used, for example, a fluororesin, a polyolefin resin, a polyamide resin, a polysulfone resin, or a rubber material. Incidentally, the sealing of the battery may be conducted by way of glass-sealing, sealing using an adhesive, welding or soldering, besides the caulking using the insulating packing shown in FIG. 5. As the material of the insulating plate 511, organic resin materials and ceramics may be used.

(Battery Housing)

The battery housing is constituted of the negative electrode can 508 and the positive electrode cap 509. As the material of the battery housing, stainless steel is preferably used. Further, as other materials of the battery housing, there are frequently used a titanium clad stainless steel, a copper clad stainless steel or a nickel-plated steel.

The negative electrode can 508 illustrated in FIG. 5 function as the battery case and also as a terminal and is therefore preferably made of stainless steel. However, where the negative electrode can 508 does not function as both the battery case and the terminal, in addition to stainless steel, a metal such as zinc, a plastic such as polypropylene, a composite material of a metal or glass fibers and a plastic may be used.

(Safety Valve 514)

As the safety valve 514 provided in the lithium secondary battery in order to ensure safety when the internal pressure in the battery is increased, for example, rubber, a spring, a metal ball or a rupture disk may be used.

EXAMPLES

The present invention is further described in detail by reference to the following examples.

A lithium secondary battery of a 18650 size (18 mm in diameter and 65 mm in height) having the sectional structure illustrated in FIG. 5 was prepared in each of Examples 1 to 4 of the present invention and Comparative Examples 1 to 5 which provide comparative examples for the Examples. The following examples are given for the purpose of illustration and not by way of limitation.

Example 1

A lithium secondary battery was prepared in Example 1 by the following procedures.

1. Preparation of Negative Electrode 503

70 parts by weight of an Si—Sn—Cu alloy (weight ratio: 80/15/5) powder with an average particle diameter of 0.5 μm as the active material for the negative electrode 503, 15 parts by weight of natural graphite with an average particle diameter of 5 μm, 3 parts by weight of acetylene black, 3 parts by weight of carboxymethylcellulose (in the form of a 2% by weight aqueous solution) and 9 parts by weight of polyvinyl alcohol (in the form of a 10% by weight aqueous solution) were kneaded to prepare a paste.

Next, the paste was applied to both surfaces of a 15 μm thick copper foil as the negative electrode current collector 501, dried, and pressed and formed by means of a roller press machine to make an electrode with a capacity per unit volume of the negative electrode active material layer 502 of 2,400 mAh/cm$^3$ (capacity per unit weight: 2,000 mAh/g; density: 1.2 g/cm$^3$) and a thickness of 16 μm. Thereafter, the thus made electrode was cut into a given size, to which a nickel lead was connected by means of spot welding to obtain the negative electrode 503.

2. Preparation of Positive Electrode 506

90 parts by weight of lithium cobaltate, 5 parts by weight of natural graphite as a conductive auxiliary material and 5 parts by weight of polyvinylidene fluoride powder were mixed, and then 5% by weight of N-methyl-2-pyrrolidone powder was added thereto. Subsequently, the resulting paste was applied to both surfaces of a 20 μm thick aluminium foil as the positive electrode current collector 504, dried, and then pressed and formed by means of a roller press machine to make an electrode with a capacity per unit volume of the positive electrode active material layer 505 of 480 mAh/cm$^3$ (capacity per unit weight: 150 mAh/g; density: 3.2 g/cm$^3$) and a thickness of 80 μm. Then, the thus made electrode was cut into a given size, to which an aluminum lead was connected by an ultrasonic welder, and dried at 150° C. under a vacuum to obtain the positive electrode 506.

3. Preparation of Electrolyte Solution (1) Ethylene carbonate and diethyl carbonate whose moisture had been sufficiently removed were mixed at a volume ratio of 3:7 to prepare a solvent.
(2) Into the solvent obtained in above (1) was dissolved lithium tetrafluoroborate (LiBF$_4$) at a concentration of 1 M (mole/L) to obtain an electrolyte solution.

4. Battery Assembly

The battery assembly was entirely conducted in a dry atmosphere controlled in moisture with a dew point of −50° C. or less.
(1) The ionic conductor 507 as the separator was sandwiched between the negative electrode 503 and the positive electrode 506, and the sandwiched member was then spirally wound so as to provide a structure of separator/positive electrode/separator/negative electrode/separator, and inserted in the negative electrode can 508 made of titanium clad stainless steel.
(2) Next, the negative electrode lead 512 was spot-welded to a bottom portion of the negative electrode can 508. Further, a constriction was formed at an upper portion of the negative electrode can 508 by means of a necking machine, and the positive electrode lead 513 was welded to the positive electrode cap 509 provided with the gasket 510 made of polypropylene by means of a spot welding machine.
(3) Next, after an electrolyte solution had been injected, the positive electrode cap 509 was put on, and the positive electrode cap 509 and the negative electrode can 509 were caulked with a caulking machine to be sealed to thereby prepare the battery.

Example 2

In this example, a battery was prepared following the same procedure as in Example 1 with the exception that the negative electrode 503 was prepared which had a capacity per unit volume of the negative electrode active material layer 502 of 1,320 mAh/cm$^3$ (capacity per unit weight: 1,100 mAh/g; density: 1.2 g/cm$^3$) and a thickness of 29 μm.

Example 3

In this example, a battery was prepared following the same procedure as in Example 1 with the exception that the negative electrode 503 was prepared which had a capacity per unit volume of the negative electrode active material layer 502 of 1,920 mAh/cm$^3$ (capacity per unit weight: 1,600 mAh/g; density: 1.2 g/cm$^3$) and a thickness of 12 μm, and 85 parts by weight of LiMn$_2$O$_4$, 10 parts by weight of carbon black as a conductive auxiliary material and 5 parts by weight of polyvinylidene fluoride powder were used to prepare the positive electrode 506 which had a capacity per unit volume of the positive electrode active material layer 505 of 270 mAh/cm$^3$ (capacity per unit weight: 100 mAh/g; density: 2.7 g/cm$^3$) and a thickness of 80 μm.

Example 4

In this example, a battery was prepared following the same procedure as in Example 1 with the exception that the negative electrode 503 was prepared which had a capacity per unit volume of the negative electrode active material layer 502 of 2,400 mAh/cm$^3$ (capacity per unit weight: 2,000 mAh/g; density of 1.2 g/cm$^3$) and a thickness of 9 μm, and 85 parts by weight of LiMn$_2$O$_4$, 10 parts by weight of carbon black as a conductive auxiliary material and 5 parts by weight of polyvinylidene fluoride powder were used to prepare the positive electrode 506 which had a capacity per unit volume of the positive electrode active material layer 505 of 270 mAh/cm$^3$ (capacity per unit weight: 100 mAh/g; density: 2.7 g/cm$^3$) and a thickness of 80 μm.

Comparative Example 1

In this comparative example, a battery was prepared following the same procedure as in Example 1 with the exception that the negative electrode 503 was prepared which had a capacity per unit volume of the negative electrode active material layer 502 of 2,700 mAh/cm$^3$ (capacity per unit weight: 2,250 mAh/g; density: 1.2 g/cm$^3$) and a thickness of 14 μm.

Comparative Example 2

In this comparative example, a battery was prepared following the same procedure as in Example 1 with the exception that the negative electrode 503 was prepared which had a capacity per unit volume of the negative electrode active material layer 502 of 2,720 mAh/cm$^3$ (capacity per unit weight: 1,600 mAh/g; density: 1.7 g/cm$^3$) and a thickness of 14 μm.

Comparative Example 3

In this comparative example, a battery was prepared following the same procedure as in Example 1 with the exception that the negative electrode 503 was prepared which had a capacity per unit volume of the negative electrode active material layer 502 of 1,040 mAh/cm$^3$ (capacity per unit weight: 1,300 mAh/g; density: 0.8 g/cm$^3$) and a thickness of 37 μm.

Comparative Example 4

In this comparative example, a battery was prepared following the same procedure as in Example 1 with the exception that the negative electrode 503 was prepared which had a capacity per unit volume of the negative electrode active material layer 502 of 1,080 mAh/cm$^3$ (capacity per unit weight: 900 mAh/g; density: 1.2 g/cm$^3$) and a thickness of 36 μm.

Comparative Example 5

In this comparative example, a battery was prepared following the same procedure as in Example 1 with the exception that the negative electrode 503 was prepared which had a capacity per unit volume of the negative electrode active material layer 502 of 2,700 mAh/cm$^3$ (capacity per unit weight: 2,250 mAh/g; density of 1.2 g/cm$^3$) and a thickness of 8 μm, and 85 parts by weight of LiMn$_2$O$_4$, 10 parts by weight of carbon black as a conductive auxiliary material and 5 parts by weight of polyvinylidene fluoride powder were used to prepare the positive electrode 506 which had a capacity per unit volume of the positive electrode active material layer 505 of 270 mAh/cm$^3$ (capacity per unit weight: 100 mAh/g; density: 2.7 g/cm$^3$) and a thickness of 80 μm.

(Evaluation of Battery Performance)

The batteries were evaluated for their performances by the following procedure.

Each of the prepared batteries was charged at a constant current of a value of 0.1 C (a current of 0.1 times the capacity/hr) obtained on the basis of the electrical capacity calculated from the positive electrode active material, and when the battery voltage reached 4.2 V, the charging was changed to a constant voltage charging at 4.2 V and continued for 10 hours in total. After resting for 10 minutes succeeding the charging, discharging was performed at a constant current of a value of 0.1 C (a current of 0.1 times the capacity/hr) until the voltage reached 2.5 V. The battery capacity was defined as the discharged electricity amount during the discharging.

Further, the cycle life was evaluated by performing charging/discharging cycles with one cycle being constituted of charging/discharging at a constant current of 0.5 C (a current of 0.5 times the capacity/hr) and a resting period for 20 minutes, and recording the number of cycles wherein 60% of the battery capacity was not reached. Incidentally, the cut-off voltage for charging was set to 4.2 V and the cut-off voltage for discharging was set to 2.7 V.

The results of the battery capacities and charge/discharge cycle lives of the batteries prepared in Examples 1 and 2 and Comparative Examples 1 to 4 are collectively shown in Table 1, in which the cycle lives for Example 1 and Comparative Examples 1 to 4 are normalized with the cycle life of the battery of Example 2 is defined as 1.0.

The results of the battery capacities and charge/discharge cycle lives of the batteries prepared in Examples 3 and 4 and Comparative Example 5 are collectively shown in Table 2. Further, Table 2 also shows the defective sample occurrence quantity such as defective coating of negative electrode, skewed rolling of electrodes, short circuit and the like. Incidentally, the cycle life and the defective sample occurrence quantity for each of Example 4 and Comparative Example 5 are normalized with the cycle life and the defective sample occurrence quantity of the battery of Example 3 is defined as 1.0.

It has been seen from Table 1 that by producing batteries so as to satisfy the conditions defined by the present invention (see FIG. 4), it is possible to stably provide a battery suitable for a specified object of use, such as a battery featuring a high capacity while securing the life to a certain extent as in Example 2, or a battery featuring a long life while still having a higher capacity than a commercially available battery with a graphite negative electrode as in Example 3.

However, it is noted that the batteries prepared in Comparative Examples-1 and 2 under such conditions as to go beyond the boundary 2 show lowering in cyclic characteristic due to deterioration of negative electrode as compared to the battery of Example 1. Further, it is seen that the batteries prepared in Comparative Examples 3 and 4 under such conditions as to fall below the boundary 1 each show cyclic characteristic similar to that of the battery of Example 2 but show considerable decrease in battery capacity.

It is seen from Table 2 that the battery prepared in Comparative Example 5 under such conditions as to go beyond the boundary 2 shows lowering in cyclic characteristic due to deterioration of negative electrode as compared to the batteries of Examples 3 and 4. Further, it is seen for the battery prepared in Comparative Example 4 under such conditions as to go beyond the boundary 3 that because the thickness of the negative electrode active material layer 502 is as thin as 10 μm or less, the defective sample occurrence quantity is somewhat greater than that of Example 3.

TABLE 1

|  | $(C_N \times D_N)/(C_P \times D_P)$ | Battery Capacity (mAh) | Normalized Cycle Life |
|---|---|---|---|
| Example 1 | 5.0 | 2,991 | 0.79 |
| Example 2 | 2.8 | 2,708 | 1.0 |
| Comparative Example 1 | 5.3 | 2,995 | 0.38 |
| Comparative Example 2 | 5.3 | 2,987 | 0.44 |
| Comparative Example 3 | 2.1 | 2,461 | 1.04 |
| Comparative Example 4 | 2.3 | 2,473 | 1.01 |

TABLE 2

|  | $(C_N \times D_N)/(C_P \times D_P)$ | Battery capacity (mAh) | Normalized cycle life | Defective Sample Occurrence Quantity as Normalized |
|---|---|---|---|---|
| Example 3 | 7.1 | 1,720 | 1.0 | 1.0 |
| Example 4 | 8.9 | 1,749 | 0.82 | 1.3 |
| Comparative Example 5 | 10.0 | 1,761 | 0.37 | 1.9 |

While the present invention has been described with reference to application to a cylindrical battery in Examples, it should be understood that the present invention is not particularly limited in battery shape and structure and applicable to lithium ion secondary batteries of various shapes.

Further, although a Si—Sn—Cu alloy (weight ratio of 80/15/5) powder has been used in Examples for the negative electrode active material, any other alloy particles mainly composed of silicon are expected to exhibit similar effect.

As described above, according to the first aspect of the present invention, with a lithium secondary battery with a negative electrode comprising a negative electrode active material layer comprising alloy particles comprising silicon and tin and having an average particle diameter of 0.05 to 2 μm as an active material, and a current collector, wherein the negative electrode active material layer has a storage capacity of 1,000 to 2,200 mAh/g and a density of 0.9 to 1.5 g/cm³, it is possible to provide a lithium secondary battery with a high capacity and a long life.

Further, according to the second aspect of the present invention, with a lithium secondary battery comprising a negative electrode comprising a negative electrode active material layer comprising alloy particles as an active material comprising silicon as a major component and a negative electrode current collector, and a positive electrode comprising a positive electrode active material layer and a positive electrode current collector, wherein the positive electrode active material layer and the negative electrode active material layer satisfy the following relationships:

$(C_N \times D_N)/(C_P \times D_P) \leq 8$ $C_N \times D_N = 1,200$ to $2,500$ mAh/cm³

$C_N = 1,000$ to $2,200$ mAh/g $D_N = 0.9$ to $1.5$ g/cm³

(wherein,
$C_N$ represents a capacity per unit weight of the negative electrode active material layer;
$D_N$ represents the density of the negative electrode active material layer;
$C_P$ represents a capacity per unit weight of the positive electrode active material layer; and
$D_P$ represents the density of the positive electrode active material layer),
it is possible to provide a lithium secondary which can freely be designed so as to meet either or both of the objects of high capacity use and long life use.

What is claimed is:

1. A lithium secondary battery comprising:
a negative electrode comprising a negative electrode active material layer comprising alloy particles as an active material comprising silicon as a major component and a negative electrode current collector; and
a positive electrode comprising a positive electrode active material layer and a positive electrode current collector,
wherein the positive electrode active material layer and the negative electrode active material layer satisfy the following relationships:

$(C_N \times D_N)/(C_P \times D_P) \leq 8$ $C_N \times D_N = 1,200$ to $2,500$ mAh/cm³

$C_N = 1,000$ to $2,200$ mAh/g $D_N = 0.9$ to $1.5$ g/cm³

$C_P = 80$ to $200$ mAh/g $D_P = 2.5$ to $3.5$ g/cm³

$C_P \times D_P = 200$ to $700$ mAh/cm³ where $C_N$ represents a capacity per unit weight of the negative electrode active material layer, $D_N$ represents the density of the negative electrode active material layer; $C_P$ represents a capacity per unit weight of the positive electrode active material layer, and $D_P$ represents the density of the positive electrode active material layer, and
wherein the alloy particles comprise silicon and tin.

2. The lithium secondary battery according to claim 1, wherein the alloy particles comprising silicon as a main component have an average particle diameter of 0.05 to 2 μm.

3. The lithium secondary battery according to claim 1, wherein the negative electrode active material layer has a thickness of 10 to 50 μm.

4. The lithium secondary battery according to claim 1, wherein the positive electrode active material layer has a thickness of 50 to 150 μm.

5. The lithium secondary battery according to claim 1, wherein the negative electrode current collector has a thickness of 6 to 30 μm.

6. The lithium secondary battery according to claim 1, wherein the positive electrode current collector has a thickness of 6 to 30 μm.

7. The lithium secondary battery according to claim 1, wherein the negative electrode active material layer comprises an active material, a binder and a conductive auxiliary material.

8. The lithium secondary battery according to claim 7, wherein at least polyvinyl alcohol is used as the binder of the negative electrode active material layer.

* * * * *